(12) United States Patent
Lemont, Jr. et al.

(10) Patent No.: US 7,742,899 B2
(45) Date of Patent: Jun. 22, 2010

(54) TEST PROCEDURE FOR DETERMINING STEERING RACK RATTLE

(75) Inventors: Charles J. Lemont, Jr., Commerce Township, MI (US); Jose M. Lopez, Brighton, MI (US); David C. Pomerville, Brighton, MI (US); Scott R. Kloess, Rochester Hills, MI (US); Robert S. Brines, White Lake, MI (US); Marc J. Tahnoose, West Bloomfield, MI (US); Darrin S. Mallard, Oxford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 232 days.

(21) Appl. No.: 12/029,482

(22) Filed: Feb. 12, 2008

(65) Prior Publication Data

US 2009/0204343 A1 Aug. 13, 2009

(51) Int. Cl.
*G06F 11/30* (2006.01)
*B62D 5/04* (2006.01)
*B62D 5/06* (2006.01)

(52) U.S. Cl. .................... 702/185; 180/444; 180/427

(58) Field of Classification Search ............ 702/33, 702/34, 35, 182, 183, 184, 185; 180/428, 180/444, 427; 280/93.514; 254/6 R, 12, 254/95, 205, 230, 341, 427; 74/388, 422, 74/574; 73/12.03, 146, 146.5, 152.03, 290 V, 73/457, 489, 626; 703/6, 7, 8
See application file for complete search history.

(56) References Cited

U.S. PATENT DOCUMENTS 6,550,568 B2 * 4/2003 Ross .................... 180/444

* cited by examiner

*Primary Examiner*—Aditya Bhat

(57) ABSTRACT

A method of determining steering rack rattle propensity of a rack and pinion steering assembly may comprise: simultaneously recording audio, and measuring acceleration of a rack, and right and left side tie-rod end loads; identifying rack rattle events from the audio recording; determining common characteristics of the measured rack acceleration and tie-rod end loads during the identified rack rattle events; creating a rack rattle index level; applying a predetermined force profile to a test rack and pinion steering assembly; measuring a test acceleration on the test rack and pinion steering assembly; calculating a test RMS level in a test frequency range using a test time constant; determining a rack rattle index value from the calculated test RMS level; and comparing the rack rattle index value to the rack rattle index level.

20 Claims, 2 Drawing Sheets

TEST PROCEDURE FOR DETERMINING STEERING RACK RATTLE

BACKGROUND OF INVENTION

The present invention relates generally to undesirable rattle that sometimes occurs in steering racks of vehicle steering systems, and more particularly to a test procedure for being able to determine a propensity for rack rattle in a vehicle from a lab test.

In conventional rack and pinion steering systems for vehicles, wear occurs in the rack and pinion system that results in increased clearance between components. Typically, the wear occurs at the interface of the rack with the pinion and in the system that preloads the rack to the pinion. The clearance resulting from the wear then results in rattles inside the steering rack that can be heard by the vehicle occupants, typically when they are driving over rough roads. The wear may actually occur early in a vehicle's life, costing a great deal to replace a steering rack or steering column, and possibly reducing a vehicle owner's satisfaction with the vehicle overall. Occasionally, depending on the design or initial settings, some racks and columns even rattle when new.

Since steering rack rattle is an audible event that can be heard by vehicle occupants, the rattle events can be binaurally recorded while driving a vehicle on rough roads and played back with high accuracy. But there is generally too much extraneous noise in these recordings to allow for objective analysis based solely on these recordings. Consequently, the typical steering rack rattle performance ratings are determined subjectively on random road test events, making repeatability very difficult. Moreover, since this is done on a vehicle level test, other components in the vehicle can make noise during the test that make it even more difficult to correctly determine the noise levels of the steering system separate from these other noises.

SUMMARY OF INVENTION

An embodiment contemplates a method of determining steering rack rattle propensity of a rack and pinion steering assembly to be used on a vehicle, the method comprising the steps of: simultaneously recording audio, and measuring acceleration of a rack, a right side tie-rod end load and a left side tie-rod end load; identifying rack rattle events from the audio recording; determining common characteristics of rack acceleration and tie-rod end loads during the identified rack rattle events; and creating a rack rattle index level that is based on measured characteristics of the rack acceleration during the rack rattle events.

An embodiment contemplates a method of determining steering rack rattle propensity of a rack and pinion steering assembly to be used on a vehicle, the method comprising the steps of: applying a predetermined force profile to a rack and pinion steering assembly; measuring a test acceleration on the rack and pinion steering assembly resulting from the predetermined force profile applied; calculating a test root mean square (RMS) level in a predetermined test frequency range using a predetermined test time constant; determining a rack rattle index value from the calculated test RMS level; and comparing the rack rattle index value to a predetermined acceptable rack rattle index level.

An advantage of an embodiment is that a lab test metric is created that can determine steering system performance in regard to rack rattle in an objective, rather than subjective, manner. This metric allows for determining a maximum acceptable noise level for steering system internal rattles in a lab test and testing steering systems to determine if they meet the acceptable noise levels. Moreover, by detecting the levels in a steering system itself, rather than when operating a vehicle, the amount of data, especially extraneous noise data that otherwise might come from other components of the vehicle, is significantly reduced. And, being an objective lab test at the component level, the rattle test can produce repeatable data, allowing accurate testing for many different designs of rack and pinion steering systems to be tested. Moreover, the tests can be conducted at the vehicle manufacturer's facilities, or at a supplier's facilities, producing consistent results.

The component level test in a lab, then, may allow rattles to be engineered out of steering systems prior to building full vehicles for testing. And, it may allow for an ability to differentiate between different suppliers of steering systems based on propensity for rattle, thus allowing for the propensity for rattle to be a factor in choosing a supplier. Such early engineering information may reduce the likelihood of having to replace steering system components in vehicles, thus reducing costs. And, vehicle testing on different road surface types may also be employed to confirm that rattles have been engineered out of the steering system.

DETAILED DESCRIPTION

Figure 1:
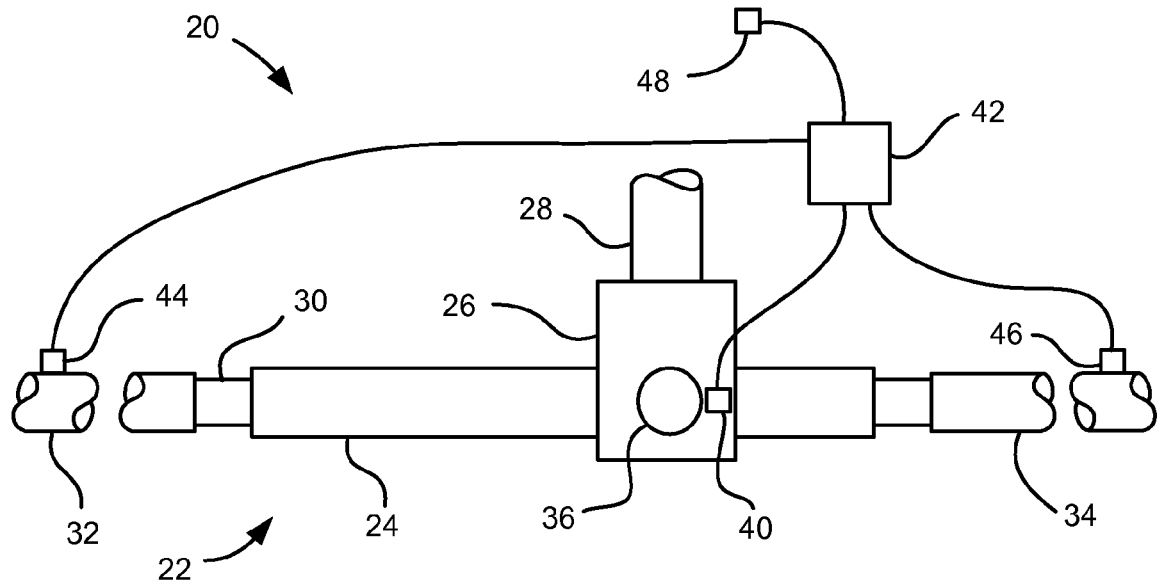
FIG. 1 is a schematic illustration of a portion of a vehicle steering assembly and measurement apparatus.

Referring to FIG. 1, a vehicle, indicated generally at 20, is shown. The vehicle 20 includes a steering assembly 22, which includes a steering rack housing 24. A gear housing 26 receives a steering shaft 28. The steering shaft 28 may have a conventional pinion gear (not shown) that mates with a conventional rack gear (not shown) on a rack 30 that slides telescopically back and forth in the steering rack housing 24. An adjuster plug 36 may be employed to bias the pinion gear and rack gear into contact with each other to limit rattle between the two. The rack 30 engages a right side tie-rod 32 at a first end and a left side tie-rod 34 at an opposite end. The right and left side tie-rods 32, 34 engage other steering assembly components (not shown) in a conventional fashion for pivoting vehicle wheels (not shown). The components discussed above may be essentially conventional, if so desired, and so will not be discussed further herein. Also, this steering assembly 22 may be mounted in a vehicle or may be mounted in a lab test setup, depending upon the data to be collected and the tests to be run.

An accelerometer 40 may be mounted on the gear housing 26 adjacent to the adjuster plug 36 and in communication with a data acquisition and analysis processor 42. Alternatively, the accelerometer 40 may be mounted on a column housing (not shown) near a reduction gear (not show), or other desired locations on the steering assembly 22. The processor 42 may also be in communication with a right tie-rod force sensor 44 mounted on the right side tie-rod 32 and a left tie-rod force sensor 46 mounted on the left side tie-rod 34. And, an audio sensor 48 (such as a microphone) may be in communication with the processor 42.

Figure 2:
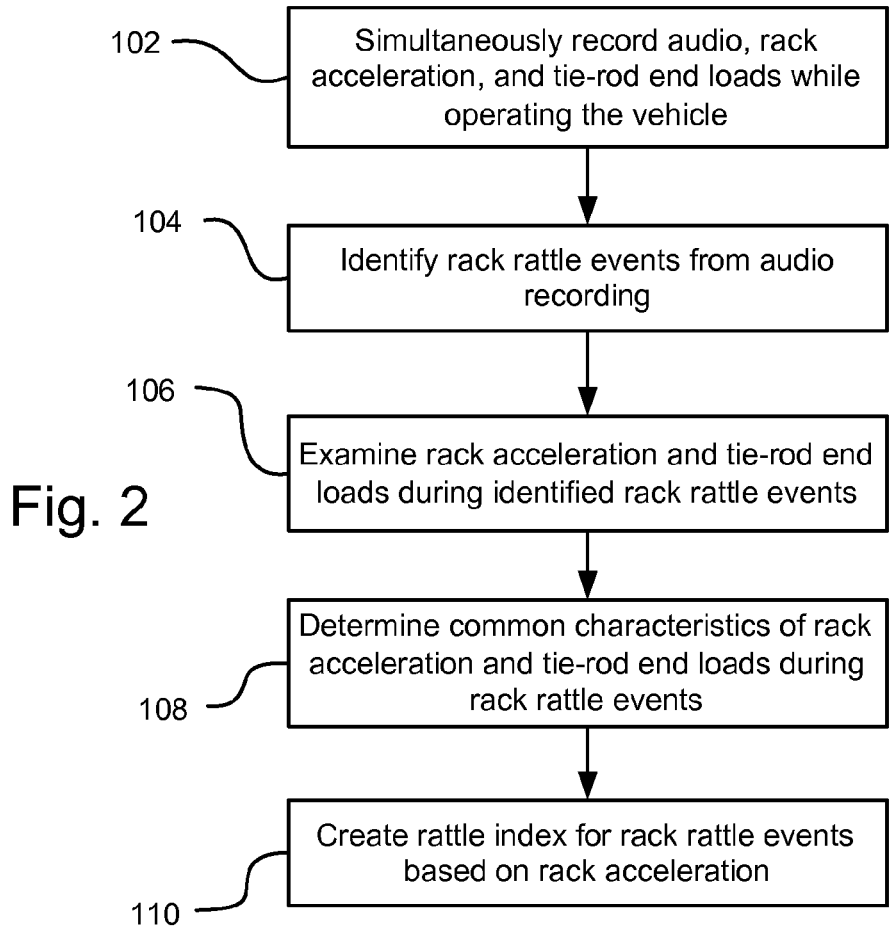
FIG. 2 is a flow chart illustrating a process for obtaining a rack rattle index.

FIG. 2 is a flow chart illustrating a process for obtaining a rack rattle index, which will be discussed with reference to the hardware discussed relative to FIG. 1. While driving a vehicle, audio, rack acceleration and tie-rod end loads are recorded simultaneously, block 102. The audio may be recorded with the audio sensor 48, rack acceleration with the accelerometer 40, and the tie-rod end loads with the right and left tie-rod force sensors 44, 46.

Later, rack rattle events are determined from the audio recording, block 104. This may involve extensive listening sessions with those familiar with rack rattle sounds to identify specific rack rattle events that may be unacceptable for some vehicle occupants. The rack acceleration and tie-rod end loads are examined for the identified rack rattle events, block 106. This may involve examining the acceleration and tie-rod end loads in both frequency and amplitude domains for the identified rack rattle events. Common characteristics of rack accelerations and tie-rod end loads are determined for the various identified rack rattle events, 108. These characteristics may include, for example, rise time, event duration, frequency content, and time structure, with the metric defined in such a way to increase signal to noise ratio of the measurement, reject the highly prevalent un-related content, and concentrate specifically on the rattle event. For example, force inputs of about 6-12 kilonewtons over a time interval of about 20 milliseconds may induce steering rack rattle. From these common characteristics of rattle events, a rattle index for rack rattle events, based on rack acceleration, is created, block 110. The rattle index can now be used without any further need to record audio for testing of future steering assemblies 22. The tests are now also based on objective rather than subjective criteria and are repeatable and accurate.

Figure 3:
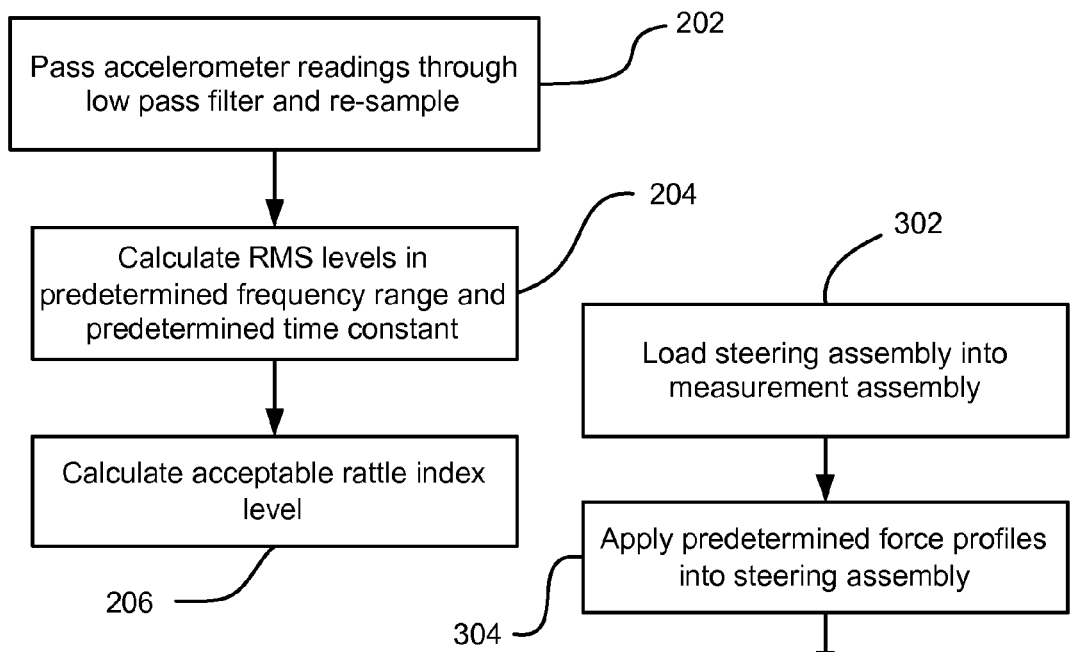
FIG. 3 is a flow chart illustrating a portion of the process of FIG. 2 in more detail.

FIG. 3 illustrates a portion of the process of FIG. 2 in more detail. More specifically, block 110 of FIG. 2 may be accomplished employing the process of FIG. 3. Readings from the accelerometer 40 are passed through a low pass filter and re-sampled, block 202. For example, after taking the data measurements, the accelerometer data may be passed through a 2500 Hertz (Hz) low pass filter and then re-sampled to 5000 Hz as a preliminary anti-aliasing precaution. Band passed root-mean-square (RMS) levels are calculated in a predetermined frequency range, using a time constant that has been correlated to the measured accelerometer and audio recordings, block 204. This tends to yield data that specifically captures a rattle event and minimizes unrelated content—increasing the signal-to-noise ratio of the rattle index. An acceptable rattle index level is calculated, block 206. For example, the level for comparison to the rattle index may be calculated in a frequency range of 500-2000 Hz, using an integration time of 20 milliseconds (ms), although integration times of about 20 to about 400 ms, correlated to on-road accelerometer and audio measurements, may be employed. The value is expressed as the rattle index, with units of milli-g-RMS (that is, thousandths of the gravitational constant (g's)—root mean square), and creates an objective rating of rattle propensity (that approximates the subjective rating), and that is a linear value. For the particular example given above, a rattle event exceeding a rattle index of 300 may be considered to be an audible rattle event.

In addition, the metric may be refined by using the technique described above with the steering assembly 22 mounted to a force input table (not shown) in a lab, if so desired. This lab data may then be employed when determining the input shape for the forcing function applied during a test (discussed below).

Figure 4:
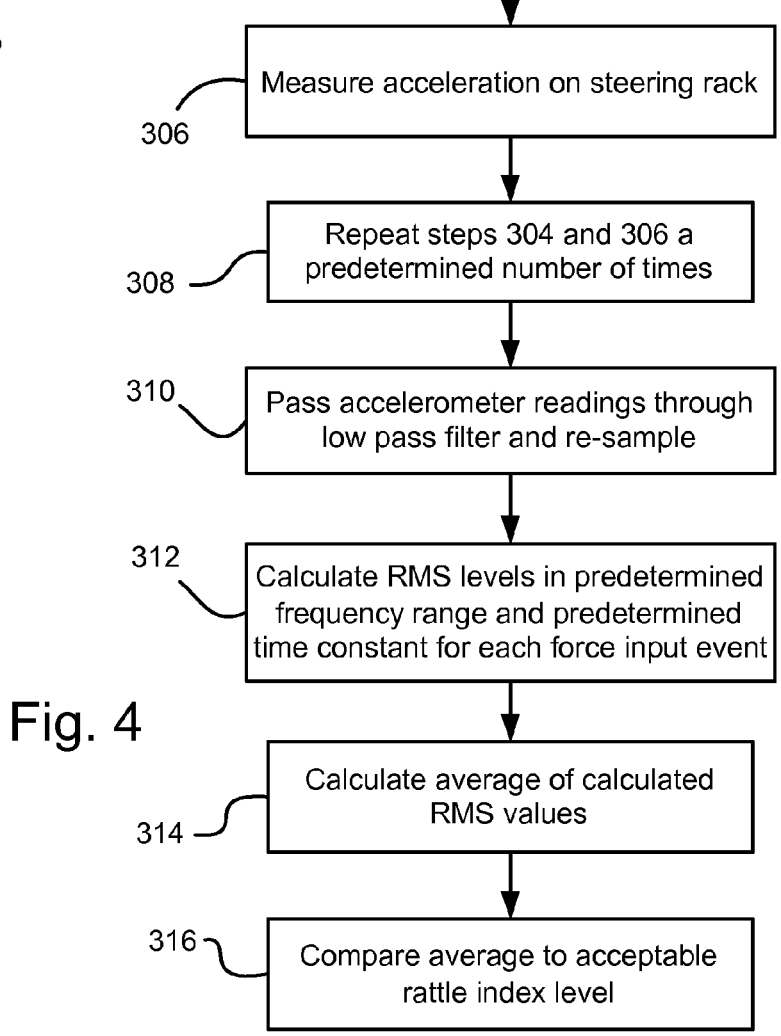
FIG. 4 is a flow chart illustrating a process of testing a steering assembly for rack rattle.

FIG. 4 illustrates a process of testing a steering assembly for rack rattle based on the rattle index, and will be discussed relative to the steering assembly 22 in FIG. 1. However, having a rattle index that will be employed, the force sensors and audio sensor are not needed, although one of the tie-rod force sensors may be employed during testing to provide closed loop test control. An existing or newly designed steering assembly 22 is mounted to a measurement assembly, such as a shaker (electro magnetic vibration energizer, not shown), in a laboratory, block 302. Predetermined force profiles (rather than acceleration profiles) are applied to the steering assembly, block 304. The force profiles may be configured to simulate, for example, a road surface with spalled concrete or Mexican Cubilete roads (Mexican river rock surfaces). The force inputs may be, for example, six to eight kilonewtons over 20 ms, with the shape based on the on-road measurements. The acceleration on the steering rack is measured by the accelerometer 40, block 306. Preferably, the predetermined force profiles are applied multiple times, with the acceleration measured each time, block 308. The number of times may be, for example, five to eight times for each type of road surface profile to be tested—although other number of repeated times may be used instead if so desired.

For a particular road profile surface, the readings from the accelerometer 40 resulting from the force inputs are passed through a low pass filter and re-sampled, block 310. The RMS levels in the predetermined frequency range and predetermined time constant are calculated for each force input event, block 312, similar to the data manipulation originally done for the on-road measurements (discussed above). For example, the levels may be calculated in a frequency range of 500-2,000 Hz, using an integration time of 20 ms (or some other integration time between about 20-400 ms, depending upon the application).

For each force input event (or for a select number of them), the average of the peaks of the calculated RMS values is calculated, block 314. For example, one may use eight force input events, and just use the last five peak values for calculating this average. Then, this average (that is, the rattle index) is compared to the acceptable rattle index level, block 316. An acceptable rattle index level may be, for example, 300 milli-g-RMS. The particular level for an acceptable rattle index can be set to whatever one believes is the threshold for rattle events being unacceptably audible within a vehicle passenger compartment.

If the average is above the acceptable rattle index level, this indicates that the particular steering assembly 22 may produce undesirable audible rattle events when employed in a vehicle. Thus, some design or assembly change may be needed for this particular design of steering assembly 22. If the average is below the acceptable rattle index, then steps 304-316 may be repeated for other forcing functions that simulate road conditions likely to cause steering rack rattle, if so desired. When all of the different forcing functions that one wishes to test have been run through the test and the steering assembly 22 does not produce any average above an acceptable rattle index level, this gives an objective indication that the particular steering assembly 22 will not produce objectionable rack rattle.

Alternatively (or in addition), the process of FIG. 4 may be applied to the vehicle 20 in an actual road test. In this case, block 302 includes locating the accelerometer 40 on the steering assembly 22 (but, again the force sensors and audio sensors would not be needed) and locating the vehicle 20 for driving over the desired type of test road surface. Block 304 includes driving the vehicle 20 over the particular test road surface—for example, a spalled concrete surface. As in block 306, the acceleration on the steering rack 30 is measured, with block 308 including analyzing the acceleration over a predetermined section of the test road surface. The accelerometer data is then processed as above and evaluated for peaks where the corresponding rattle index is above the acceptable rattle index level. Again, an objective measurement is employed that is repeatable.

While certain embodiments of the present invention have been described in detail, those familiar with the art to which this invention relates will recognize various alternative designs and embodiments for practicing the invention as defined by the following claims.

What is claimed is:

1. A method of determining steering rack rattle propensity of a rack and pinion steering assembly to be used on a vehicle, the method comprising the steps of:
   (a) simultaneously recording audio, and measuring acceleration of a rack, a right side tie-rod end load and a left side tie-rod end load;
   (b) identifying rack rattle events from the audio recording;
   (c) determining common characteristics of the measured rack acceleration and tie-rod end loads during the identified rack rattle events; and
   (d) creating a rack rattle index level that is based on measured characteristics of the rack acceleration during the rack rattle events.

2. The method of claim 1 wherein step (d) is further defined by:
   passing the measured acceleration through a low pass filter and re-sampling the filtered acceleration measurements;
   calculating RMS levels in a predetermined frequency range using a predetermined time constant; and
   determining the rack rattle index level from the calculated RMS levels.

3. The method of claim 2 wherein step (d) is further defined by the low pass filter being a 2500 Hz low pass filter and the re-sampling occurring at 5000 Hz.

4. The method of claim 2 wherein step (d) is further defined by the RMS levels being calculated with the predetermined frequency range being 500-2000 Hz, using the predetermined time of between 20 and 400 ms.

5. The method of claim 2 wherein step (d) is further defined by the rattle index level being 300 milli-g-RMS.

6. The method of claim 1 wherein step (a) is further defined by the acceleration measurement including mounting an accelerometer on a gear housing adjacent to an adjuster plug.

7. The method of claim 1 wherein step (a) is further defined by the right side tie-rod end load measurement including mounting a right tie-rod force sensor on a right side tie-rod, and the left side tie-rod end load measurement including mounting a left tie-rod force sensor on a left side tie-rod.

8. The method of claim 1 further comprising:
   (e) applying a predetermined force profile to a test rack and pinion steering assembly;
   (f) measuring a test acceleration on the test rack and pinion steering assembly resulting from the predetermined force profile applied;
   (g) calculating a test RMS level in a predetermined test frequency range using a predetermined test time constant;
   (h) determining a rack rattle index value from the calculated test RMS level; and
   (i) comparing the rack rattle index value to the rack rattle index level.

9. The method of claim 8 wherein step (g) is further defined by passing the measured test acceleration through a low pass filter and re-sampling the filtered test acceleration measurements prior to calculating the test RMS levels.

10. The method of claim 8 further comprising:
    repeating steps (e) through (g) to obtain a plurality of test RMS levels;
    averaging peaks of the plurality of test RMS levels to obtain an average of the test RMS levels; and
    step (h) includes determining the rack rattle index value from the average of the test RMS levels.

11. The method of claim 8 wherein step (e) is further defined by loading the test rack and pinion steering assembly into a measurement assembly prior to applying the predetermined force profile.

12. The method of claim 8 wherein step (e) is further defined by assembling the test rack and pinion steering assembly to a test vehicle and operating the test vehicle on a predetermined road surface type to thereby apply the predetermined force profile.

13. A method of determining steering rack rattle propensity of a rack and pinion steering assembly to be used on a vehicle, the method comprising the steps of:
    (a) applying a predetermined force profile to a rack and pinion steering assembly;
    (b) measuring a test acceleration on the rack and pinion steering assembly resulting from the predetermined force profile applied;
    (c) calculating a test RMS level in a predetermined test frequency range using a predetermined test time constant;
    (d) determining a rack rattle index value from the calculated test RMS level; and
    (e) comparing the rack rattle index value to a predetermined acceptable rack rattle index level.

14. The method of claim 13 wherein step (c) is further defined by passing the measured test acceleration through a low pass filter and re-sampling the filtered test acceleration measurements prior to calculating the test RMS levels.

15. The method of claim 13 further comprising:
    repeating steps (a) through (c) to obtain a plurality of test RMS levels;
    averaging peaks of the plurality of test RMS levels to obtain an average of the test RMS levels; and
    step (d) includes determining the rack rattle index value from the average of the test RMS levels.

16. The method of claim 13 wherein step (a) is further defined by loading the rack and pinion steering assembly into a measurement assembly prior to applying the predetermined force profile.

17. The method of claim 13 wherein step (a) is further defined by assembling the test rack and pinion steering assembly to a test vehicle and operating the test vehicle on a predetermined road surface type to thereby apply the predetermined force profile.

18. The method of claim 13 wherein step (e) is further defined by the predetermined acceptable rack rattle index level being determined by:
    simultaneously recording audio, and measuring acceleration of a rack, a right side tie-rod end load and a left side tie-rod end load;
    identifying rack rattle events from the audio recording;
    determining common characteristics of the measured rack acceleration and tie-rod end loads during the identified rack rattle events; and
    creating the rack rattle index level based on measured characteristics of the rack acceleration during the rack rattle events.

19. The method of claim 18 wherein creating the rack rattle index level is further defined by:

passing the measured acceleration through a low pass filter and re-sampling the filtered acceleration measurements;

calculating RMS levels in a predetermined frequency range using a predetermined time constant; and determining the rack rattle index level from the calculated RMS levels.

20. A method of determining steering rack rattle propensity of a rack and pinion steering assembly to be used on a vehicle, the method comprising the steps of:

(a) simultaneously recording audio, and measuring acceleration of a rack, a right side tie-rod end load and a left side tie-rod end load;

(b) identifying rack rattle events from the audio recording;

(c) determining common characteristics of the measured rack acceleration and tie-rod end loads during the identified rack rattle events;

(d) creating a rack rattle index level that is based on measured characteristics of the rack acceleration during the rack rattle events;

(e) applying a predetermined force profile to a test rack and pinion steering assembly;

(f) measuring a test acceleration on the test rack and pinion steering assembly resulting from the predetermined force profile applied;

(g) calculating a test RMS level in a predetermined test frequency range using a predetermined test time constant;

(h) determining a rack rattle index value from the calculated test RMS level; and (i) comparing the rack rattle index value to the rack rattle index level.

* * * * *